Nov. 18, 1969 YING-CHEN HWANG 3,479,535

SYMMETRICAL PULSE GENERATOR CONTROLLED BY SELF-RESETTING SNAP DIODES

Filed Nov. 23, 1966

Ying-Chen Hwang,
INVENTOR.

BY Harry M. Saragovitz
Edward J. Kelly
Herbert Berl
Alfred E. Smith

United States Patent Office 3,479,535

Patented Nov. 18, 1969

3,479,535

SYMMETRICAL PULSE GENERATOR CONTROLLED BY SELF-RESETTING SNAP DIODES

Ying-Chen Hwang, Liverpool, N.Y., assignor, by mesne assignments, to the United States of America as represented by the Secretary of the Army Filed Nov. 23, 1966, Ser. No. 596,739

Int. Cl. H03k 3/26

U.S. Cl. 307—319 3 Claims

ABSTRACT OF THE DISCLOSURE

A self-resetting pulse generator that provides a variable width bipolar pulse train. A snap diode in parallel with an output circuit conducts for a predetermined time to control the portion of an input signal that is applied to the generator output. Another snap diode in series with the output circuit is activated when the parallel diode ceases conduction and thereby allows current to flow through the load circuit. The series connected diode cuts off when a stored charge therein is dissipated, thus resetting the circuit.

This invention relates generally to signal generators and more particularly to a pulse generator providing variable width bipolar current pulses.

Pulse circuits are frequently essential in electrical systems for the automatic control of manufacturing processes; for the operation of systems or portions of a system, such as aircraft, radar, and computers; and for continuous and periodic measurement of electrical or non-electrical quantities, such as distance and temperature. A pulse shaping network generates the special waveform required to perform a given operation within a system.

In systems especially designed for mobility or remote locations, design emphasis is placed on such desirable factors for system components as being compact, lightweight, low in power consumption, highly efficient, and more reliable.

An object of this invention is to provide a simple, compact pulse-shaping network.

Another object of this invention is to provide a means for generating a variable width bipolar pulse train.

A further object of this invention is to provide a means for generating a pulse train with a monotonic time function that is symmetrical and has fast leading and trailing edges.

Figure 1:
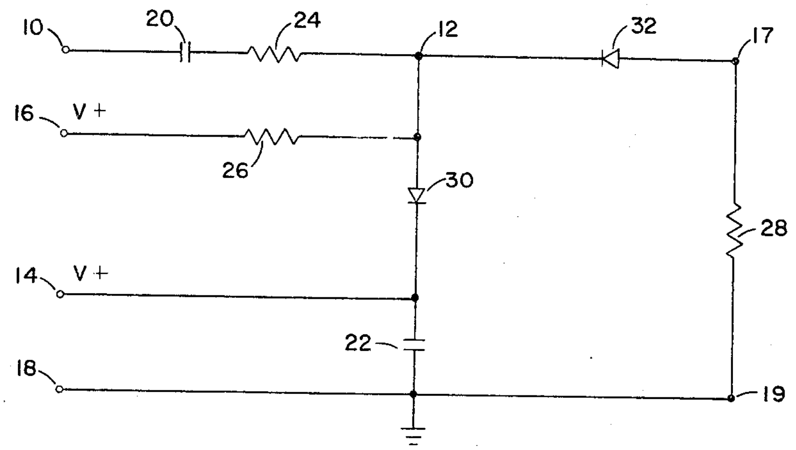
Figure 2:
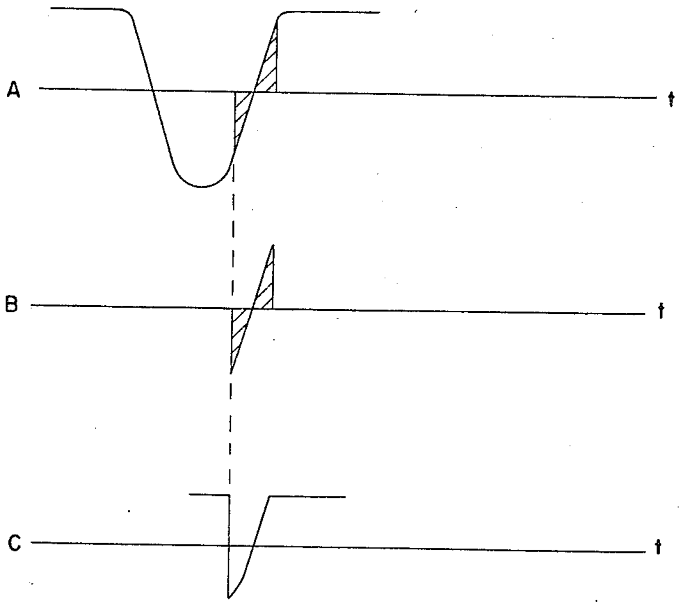

Other objects and advantages of this invention will be better understood from the following detailed description and from the accompanying drawings illustrating an example of the invention and wherein:

FIGURE 1 is a schematic diagram of an embodiment made in accordance with the principles of this invention; and FIGURE 2 is a time diagram showing representative waveforms which exist at various points throughout the embodiment of the invention shown in FIGURE 1.

Referring now to the drawing, FIGURE 1 shows a schematic representation of one embodiment of the invention wherein a first snap diode 30 controls the output pulse width and a second snap diode 32 in conjunction with the input waveform determines the symmetry of the output pulse. The snap diodes 30 and 32 may be of the type described in Transistor Manual, seventh edition page 451, copyright 1964 by the General Electric Company.

This embodiment constitutes a passive network in which the input or driving waveform is applied to a first input terminal 10 which is connected through a capacitor 20 and a resistor 24 to a terminal 12 which is connected through diode 30 in the forward direction to a terminal 14. Terminal 12 is also connected through a resistor 26 to a terminal 16, and through diode 32 in the reverse direction to one side of a load which is represented as resistor 28 connected between output terminals 17 and 19. A second input terminal 18, the circuit common or return path, is connected through a capacitor 22 to terminal 14 and to the cathode of diode 30. Terminal 18 is also connected to terminal 19 which is connected to the other side of load resistor 28.

In operation of the embodiment of FIGURE 1, diode 30 is initially clamped to a positive voltage applied to terminal 14, which is higher than the required positive peak of the bipolar output pulse. A positive current is applied to diode 30, from a voltage on terminal 16, to store an amount of charge in diode 30 that is equal to a predetermined percentage of the negative portion of the input waveform. Diode 32 is initially blocked by a positive voltage on terminal 12 and the drop of diode 30. When the input current (as shown in FIGURE 2A) is applied to terminal 10, diode 30 will not turn off (i.e., snap off) until the time when the predetermined percentage of the negative portion of the input waveform is equal to the stored charge in diode 30. While the input signal of FIGURE 2A is positive on terminal 10, diode 30 is conducting and is forward biased. When the input signal goes negative, diode 30 is reverse biased and continues to conduct while dissipating the charge stored therein. The unshaded negative part of the input wave of FIGURE 2A is representative of the time lapsed between reverse bias of diode 30 and cut-off. Cut-off of diode 30 occurs when the charge thereon is dissipated, represented by the beginning of the negative shaded area on the time axis of FIGURE 2A. Capacitor 22 controls the operating voltage level of diode 30, and prevents the cathode bias thereof from affecting the load circuit. When diode 30 snaps off, the input current begins to flow through the load and through diode 32 in the forward direction. At the time diode 30 snaps off, the voltage at terminal 12 will be as shown in FIGURE 2C. A charge is stored in diode 32 that is proportional to the forward current flow through diode 32. When the input wave goes positive, reverse current will flow through diode 32 until the total positive output waveform is equal to the negative output wavefore, as shown in FIGURE 2B. At this time, diode 32 will have discharged completely and the voltage at terminal 12 will be positive; diode 32 will snap off, thereby returning the circuit to its initial condition.

Although a particular embodiment and form of this invention has been illustrated, it is understood that modifications may be made by those skilled in the art without departing from the scope and spirit of the foregoing disclosure.

What is claimed is:

1. A pulse generator for providing a symmetrical bipolar pulse of variable width, comprising: a first and second input terminal; a first semiconductor snap diode connected between said input terminals; a first output terminal; a second semiconductor snap diode connected between said first input terminal and said first output terminal; a second output terminal connected to said second input terminal; means biasing said first snap diode; a capacitor connected between a first electrode of said first diode and the second input terminal; a resistance-capacitance network connected between the first input terminal and a second electrode of said first diode; and a resistance coupling means connected to said second electrode of said first diode, through which a positive charging current is applied to the diode.

2. The pulse generator as set forth in claim 1 wherein said biasing means applies a positive clamping voltage to the first electrode of said first diode; the second electrode of said first diode being connected to a first electrode of said second diode; a second electrode of said second diode being connected to the first output terminal; and said resistance-capacitance network is a series connected resistor and capacitor.

3. The pulse generator as set forth in claim 2 wherein said first electrode of said first and second diodes is a cathode; and said second electrode of said first and second diodes is an anode.

References Cited

UNITED STATES PATENTS

| | | | |
|---|---|---|---|
| 3,132,259 | 5/1964 | Magleby | 307—281 X |
| 3,168,654 | 2/1964 | Lewis | 307—319 |
| 3,292,006 | 12/1966 | Candy et al. | 307—319 X |

OTHER REFERENCES

John Giorgis, Understanding Snap Diodes, November, 1963, pp. 1–4 (note FIGURE 10).

DONALD D. FORRER, Primary Examiner

J. D. FREW, Assistant Examiner

U.S. Cl. X.R.

307—280, 281